Dec. 6, 1927.
J. ZIMMERMAN ET AL
1,651,983
MEANS FOR CONDUCTING STATIC ELECTRICITY FROM EXTRACTORS
Filed May 13, 1927
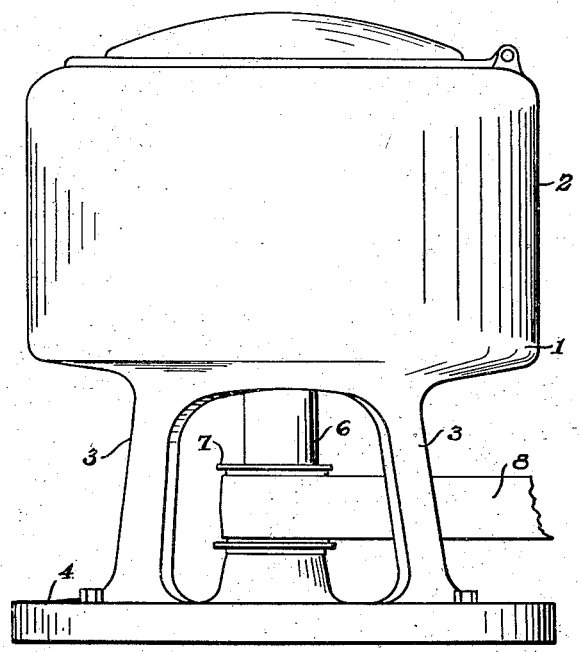
Fig.1.
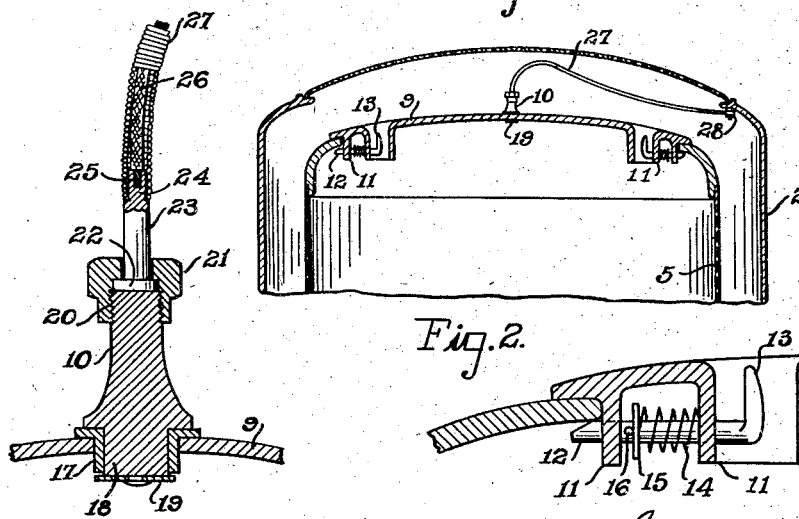
Fig.2.
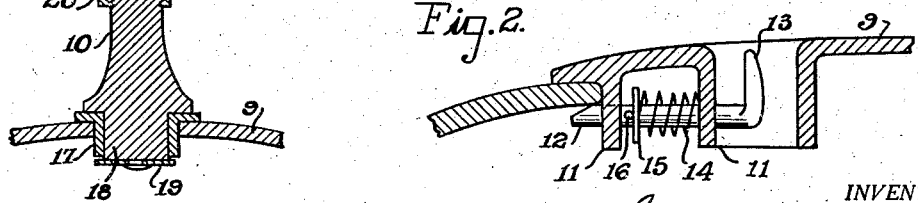
Fig.3.
Fig.4.
INVENTORS.
Joseph Zimmerman and
BY Friedrich A. Block,
Honora S. Smith,
ATTORNEY Patented Dec. 6, 1927.

1,651,983

UNITED STATES PATENT OFFICE.

JOSEPH ZIMMERMAN AND FRIEDRICK A. GLOCK, OF DAYTON, OHIO.

MEANS FOR CONDUCTING STATIC ELECTRICITY FROM EXTRACTORS.

Application filed May 13, 1927. Serial No. 191,106.

This invention relates to new and useful improvements in means for conducting static electricity from extractors.

It is the principal object of our invention to provide simple and readily attachable means for conducting static electricity from extractors in which an inflammable liquid is removed by centrifugal force from the articles they contain.

In cleaning establishments it frequently happens that the static electricity formed in an extractor will ignite the inflammable liquid, to cause a serious fire. Our invention removes this danger by automatically conducting from the extractor, while it is in motion, any static electricity that may be formed therein.

In the accompanying drawings illustrating our invention, Figure 1 is a side view of an extractor equipped with our means for conducting static electricity from the rotating clothes container. Figure 2 is a vertical sectional view taken through the upper part of the extractor, showing the conductor attached to the lid of the inner vessel. Figure 3 is a vertical sectional view taken through the collector and conductor. And Figure 4 is a detailed sectional view taken through one of the latches for securing the lid on the inner bowl.

Referring to the accompanying drawings for a detailed description of our invention, the numeral 1 designates an extractor of a conventional type. This extractor comprises an outer casing 2 which is mounted on legs 3, 3 secured to a base 4. (See Figures 1 and 2).

Mounted for rotation within the outer casing 2 is a perforated bowl or receptacle 5 adapted to receive through its open top, garments or other articles from which an inflammable cleaning liquid, such as gasoline, is removed by centrifugal force. The bowl 5 is rotated by a shaft 6, pulley 7, and belt 8 leading to a source of power not shown.

For the purpose of conducting any static electricity that may form in the revolving bowl 5 through the frictional contact of its fabric contents with its walls and other parts, we provide for the opening in the top of the receptacle 5 a lid 9 to which a collector 10 is loosely secured.

That the lid 9 may be quickly and firmly attached to the top portion of the bowl 5, said lid is formed around its outer circular edge with downwardly directed latch receiving projections 11. Each projection comprises an n shaped outer part and a tubular inner part. Through holes in the legs of the n shaped part a latch member 12 projects for movement under the adjacent circular edge of the bowl to latch the lid 9 to the latter. Each latch member has an upturned finger grip end 13 within the tubular portion of the projection 11, for convenient access to the finger of the operator and by which it may be drawn outwardly, to release the lid from the bowl, against the tension of a spring 14. This spring surrounds the latch member 12 between a disc 15 secured against a pin 16 carried by it, and the inner leg of the n portion of the projection 11. (See Figures 2 and 4). By these latches 12 the lid 9 may be easily attached to, and removed from, the perforated bowl 5.

For the purpose of conducting static electricity from the revolving bowl 5, the collector 10 is secured to the lid 9 as follows. Formed in the middle portion of said lid is a hole which receives a flanged bushing 17. Mounted for a free rotary movement in said bushing 17 is the reduced end 18 of the collector 10. To the bottom of the latter there is secured a retaining disc 19 to loosely hold the collector in the bushing 17. (See Figures 1 and 3).

The collector 10 tapers inwardly to its upper threaded end 20 which receives a threaded cap 21. By means of this cap, which covers a head 22 on the lower end of a conducting member 23, the latter is connected to the collector 10. (See Figure 3).

The conducting member 23 terminates at its upper end in a reduced portion 24 formed with an axial hole in which one end of a conducting wire 25 is soldered. This wire is covered with insulation material 26, and the insulated wire is in turn surrounded by a coiled wire casing 27 that is fitted at its lower end over the reduced portion of the conducting member 23. (See Figure 3).

The flexible conductor just described is connected to the outer casing 2 at the point 28 in Figure 2, to conduct thereto, away from the inflammable liquid, any static electricity formed in the bowl 5 when the latter is rotated.

We do not wish to be limited to the details of construction herein shown and described, and any changes or modifications may be made therein within the scope of the subjoined claims.

Having described our invention, we claim:

1. An apparatus of the type described, comprising an outer casing, a receptacle free to revolve therein for the extraction of an inflammable liquid from articles which it contains, one closed end of said receptacle formed with an axial hole, an electric collector free to turn in said hole, and an electric conductor connected to said collector.

2. An apparatus of the type described, comprising an outer casing, a receptacle rotatable therein for the extraction of an inflammable liquid from the articles which it contains, a lid for said receptacle formed with a central hole, an electric collector free to turn in said hole, and an electric conductor connected to said collector.

3. An apparatus of the type described, comprising an outer casing, a receptacle rotatable therein for the extraction of an inflammable liquid from the articles which it contains, a lid for said receptacle and formed with a central hole, a flanged bushing therein, a collector member having a reduced portion free to turn in said bushing, a retaining disc secured to said collector member below the lid, and an electric conductor connected to said collector member.

4. An apparatus of the type described, comprising an outer casing, a receptacle rotatable therein for the extraction of an inflammable liquid from the articles which it contains, a lid for said receptacle formed with a central hole, an electric collector free to turn in said hole, and a flexible conductor removably connected between said collector and the outer casing for the purpose specified.

In testimony whereof we have hereunto set our hands this 10 day of May, 1927.

JOSEPH ZIMMERMAN.
FRIEDRICK A. GLOCK.